Dec. 13, 1938.  A. F. BRUNKOW  2,139,931

SPEED CONTROL FOR WELDING MACHINES

Filed March 29, 1937  2 Sheets-Sheet 1

Inventor

Alvin F. Brunkow

By Clarence A. O'Brien
Hyman Berman
Attorneys

Dec. 13, 1938. A. F. BRUNKOW 2,139,931
SPEED CONTROL FOR WELDING MACHINES
Filed March 29, 1937 2 Sheets-Sheet 2

Inventor
Alvin F. Brunkow

By Clarence A. O'Brien
Hyman Berman
Attorneys

Patented Dec. 13, 1938

2,139,931

UNITED STATES PATENT OFFICE 2,139,931

SPEED CONTROL FOR WELDING MACHINES

Alvin F. Brunkow, Alma, Wis.

Application March 29, 1937, Serial No. 133,691

3 Claims. (Cl. 290—40)

My invention relates to improvements in speed controls for portable power driven welding machines.

By way of explanation, portable welding machines are usually provided with a power plant including an internal combustion engine and a generator driven thereby, and are frequently equipped with a governor operatively connected to the throttle valve of the carburetor for control of the engine to maintain a uniform speed of operation of said engine and generator sufficient for welding purposes. As will be understood, it is frequently desirable to cut down the engine to idling speed, for instance, when the operator is changing his position, changing electrodes, cleaning and preparing welds, or changing from one job to another.

With the foregoing in mind, it is the primary object of my invention to provide a practical efficient mechanism for controlling the speed of the engine of such welders either through the medium of the governor or directly by the carburetor throttle valve to throttle the engine down to idling speed when welding is not being performed and which may be applied to welding machines of the type above identified without necessitating modification of the adjunctive parts of the machine.

Another object is to provide speed control mechanism for the purpose above set forth embodying timing means for effecting a gradual return of the engine from normal welding speed to idling speed.

Other, and subordinate objects, are also comprehended by my invention, all of which, together with the exact nature of my improvements, will be understood when the following description and claims are read with reference to the accompanying drawings.

Figure 1:
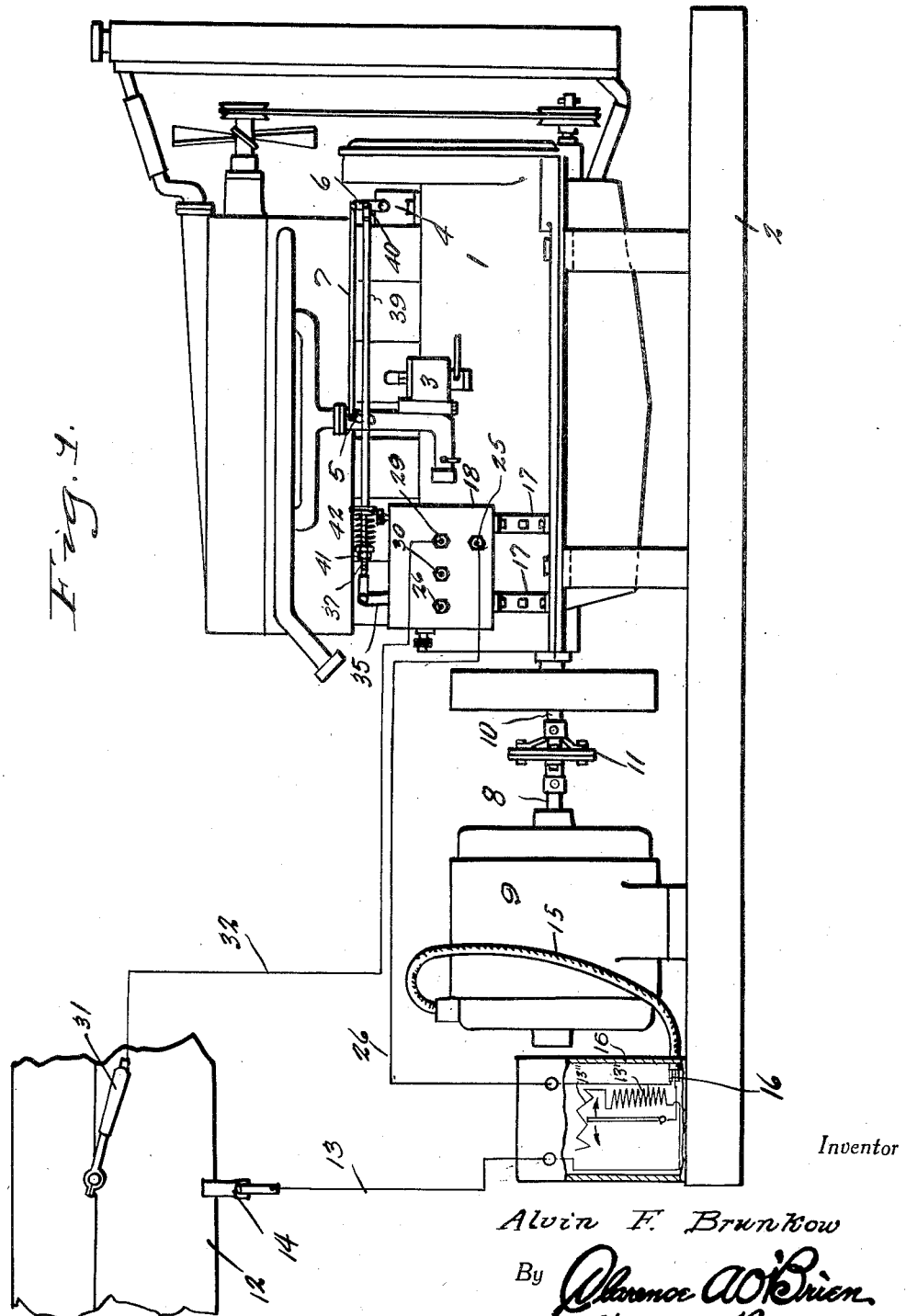
Figure 1 is a view in side elevation of a welding machine equipped according to my invention.

Describing now the illustrated embodiment of my invention, with reference to the drawings by numerals, 1 designates the usual internal combustion engine of a well known type of portable welding machine mounted on a base 2, 3 the carburetor, and 4 the governor. The details of construction of the governor are immaterial to the present invention and therefore need not be entered into herein. Suffice it to explain that the type of governors with which the usual welding machines are equipped is settable to predetermine the speed to be attained by the engine and is operatively connected to the throttle lever 5 of the carburetor 3 by means of a rocking lever 6 on said governor and a link 7 connecting said lever to the throttle lever 5, as shown in Figure 1. The shaft 8 of the generator 9 is connected to the crank shaft 10 of the engine 1 by means of the coupling 11. The generator 9 is grounded on one side to the work 12 by means of a lead 13 secured to said work by the usual clamp 14, and extending from said generator into a housing 16 containing the usual inductor 13' and variable resistance 13" interposed in the line of connection between said generator and work. The inductor 13' and resistance 13", as will be understood, serve to stabilize the welding arc.

Suitably secured to the engine 1, as by bracket 17, is a control box of any suitable material. Within the control box 18 is an electro-magnet 19 including the usual core 20 having right angled ends 21 and a coil 22 intermediate said ends. The electro-magnet 19 is secured in upright position to the bottom of the control box 18 by one of its ends through the medium of screws 23, and insulation blocks 24 interposed between said end 21 and the bottom of the control box 18. One end of the coil 22 is extended and connected to a binding post 25 on the front of the control box 18. The other side of the generator 9 is connected to said binding post 25 by means of a lead 26 extending through the cable 15 and through the housing 16. The opposite end of the coil 22 is extended to a binding post 26 on the outside of the control box 18. Intermediate its ends said coil is tapped at two different points and connected as by leads 27 and 28 to a pair of binding posts 29 and 30, respectively, located in the same manner, on the control box 18, as the binding post 26. The usual welding electrode 31 is connected by a lead 32 to one or the other of the binding posts 26, 29, 30, as occasion may require, depending upon the size of the electrode used and current requirements. As will be understood, the described connections of the coil 19 to the binding posts 26, 29 and 30 provide for using a greater or lesser number of convolutions of said coil to prevent overheating of the latter when welding steadily with a current of high amperage.

Pivotally mounted on the lower arm 21 of the coil 20, as by a bracket 33 and pivot pins 34, is an upstanding lever 35 extending at its upper end through a slot 36 in the top of the control box 18 and movable in one direction by the magnetic attraction of the upper arm of the coil 20. The upper end of the lever 35 is operatively connected, in this instance, to the beforementioned governor lever 6 so that upon movement of said lever 35 under the influence of the electro-magnet 19, said governor lever 6 will be rocked in the proper direction to open the carburetor throttle valve, not shown, through the medium of the described link 7 and throttle valve lever 5. The operating connection takes the form of a rod 37 pivoted, as at 38, to the upper end of the lever 35 and slidably mounted at its free end in a sleeve 39 pivotally connected, as at 40, to the governor arm 6. A nut 41 threaded upon the rod 37 and a compression spring 42 interposed between said nut and the sleeve 39 provide a yielding connection between the rod 37 and sleeve 39 whereby movement of the lever 35 under the attraction of the magnet 19 yieldingly operates the governor lever 6 for the purpose previously set forth. The purpose of the described yielding connection is to provide for independent operation of the governor lever 6 in opposition to the lever 35, for instance, if the engine should attain a speed above that required for welding purposes, in which event, as will be understood, the governor 4 functions to cut down the speed to welding requirements. Obviously, the speed of the engine 1 may be finely regulated by manipulation of the nut 41 to compress the spring 42, or decreasing the tension exerted thereby so that opposition to independent operation of the governor lever 6 may be varied thereby varying its throw and consequently the extent to which the throttle lever 5 is operated thereby. Threaded into a sleeve 43 suitably secured to the control box 18 is a thumb screw 44 disposed in the path of movement of the lever 35 to limit movement of the latter in a return direction. A further function of the thumb screw 44 will presently appear.

As will now be seen, when the electrode 31 is brought into arcing relation to the work 12, a circuit is completed through the lead 32, the selected binding posts 26, 29, or 30, then through the portion of the coil 19 related to said binding posts to the binding post 25, then by way of the lead 26 through the generator 9 to ground by way of the lead 13. The appropriate portion of the coil 19 is thus energized and the lever 35 operated in the manner and with the results previously described. As soon as the electrode 31 is removed from arcing relation to the work 12, said circuit is broken. The lever 35 is then returned through the medium of the following timing means.

Figure 2:
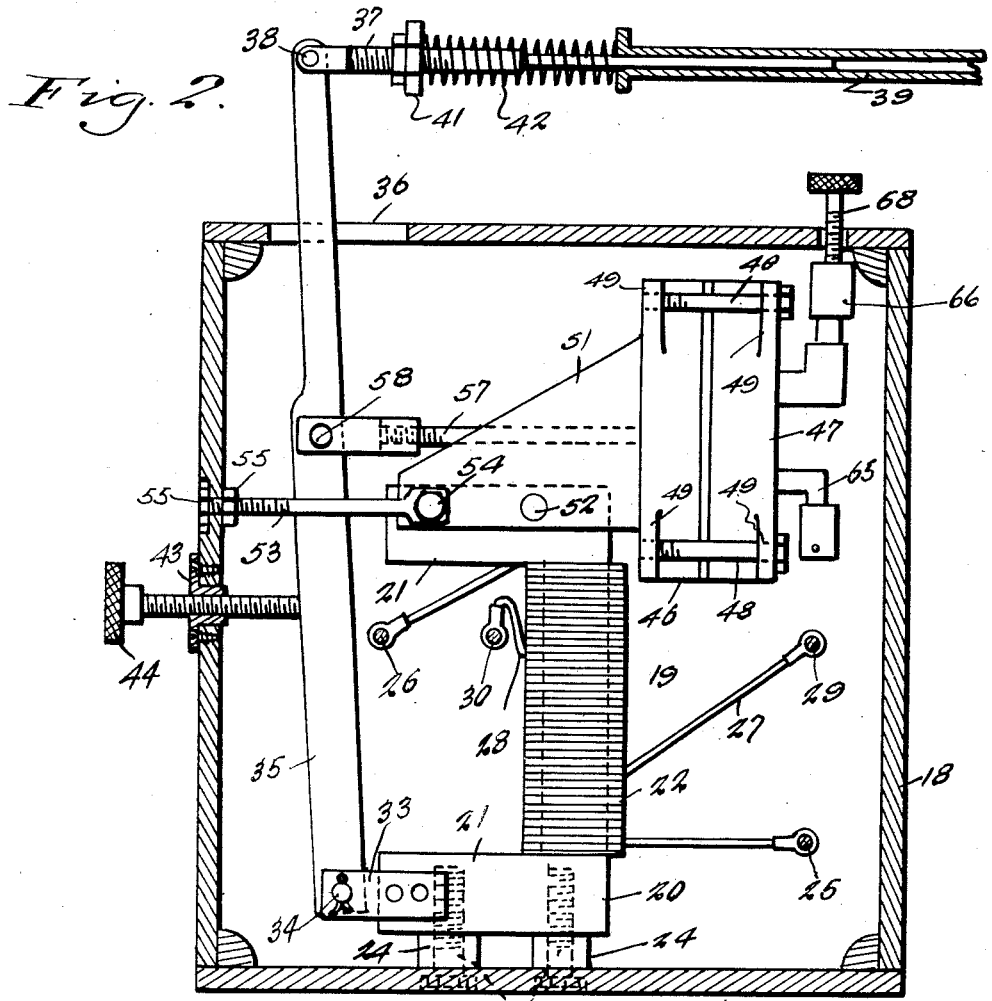
Figure 2 is a view partly in vertical longitudinal section and partly in side elevation of a control box forming part of my invention and illustrating magnetic throttle and governor controlling mechanism and timing means housed therein.
Figure 3:
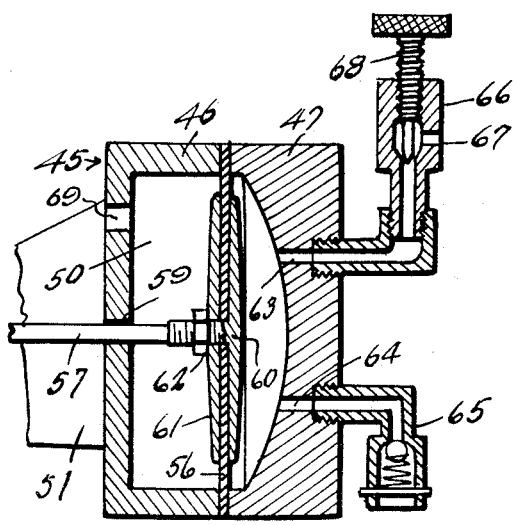
Figure 3 is a view in vertical section of said timing means.

At the top of the electro-magnet 19 is a casing 45 comprising complemental front and rear sections 46 and 47 secured together in opposed relation by bolts 48 passing through ears 49 on the said sections, respectively, and forming in such relation a circular chamber 50. The front section 46 is provided with a pair of parallel flanges 51 by means of which said casing 45 is mounted, as by bolt 52, on the upper end 21 of the core 20, with the axis of the chamber 50 in the plane of the lever 35. A bolt 53 is secured as at 54 to one of said flanges 51, extended through one side wall of the control box 18, and adjustably clamped to said side wall by opposed clamping nuts 55, as shown in Figure 2. A rubber diaphragm 56 is clamped between the sections 46 and 47 to partition the chamber 50 transversely intermediate its front and rear sides. A piston rod 57 is pivotally mounted, at one end, as at 58, on the lever 35 to extend between the flanges 51 and through an aperture 59 in the front wall of the casing 45 into the latter. The piston rod 57 has a disc-like head 60 thereon between which and a similar disc 61 on said rod the diaphragm 56 is clamped by a nut 62 threaded on said rod. The rear section 47 of the casing 45 is provided with an inlet port 63 and an outlet port 64, both communicating with the chamber 50 on the rear side of the diaphragm 56. A suitably tensioned ball valve 65 is threaded into the port 64. A needle valve 66 having an inlet port 67 and a valve member 68 is threaded into the inlet port 63 with the member 68 extending through the control box 18 for manipulation exteriorly thereof. A vent opening 69 is provided in the section 46 to release air from the chamber 50 on the front side of the diaphragm 56 and to admit air into said chamber for a purpose presently seen.

Normally the valve member 68 is adjusted to provide for the admission of a small quantity of air therethrough. When the lever 35 is swung, as previously described, into a position to effect acceleration of the engine 1, the piston rod 57 is moved rearwardly in opposition to reaction of the diaphragm 56, thereby expelling the air from the rear of the chamber 50 through the outlet valve 65 and creating a vacuum in the chamber 50 in the rear of the diaphragm 56. When the electro-magnet 19 is deenergized, as by rupture of the welding arc, said vacuum is broken slowly by leakage of air through the inlet valve 66 under reaction of the diaphragm 56 thereby retarding return of said diaphragm to normal position. The result is that the piston rod 57 and lever 35 are returned slowly by reaction of the diaphragm 56 and the engine 1 decelerated gradually to idling speed. If the needle valve 66 is fully opened, the speed of the engine is quickly reduced to idling speed. As will be clear, by adjusting the needle valve member 68, the rate of deceleration of the engine 1 may be varied in accordance with different operating requirements. By screwing the hand screw 44 inwardly against the lever 35, the latter may be locked against return so that the described control means may be rendered ineffective as regards return of said lever. Thus, when the engine is cold, it may be kept running at welding speed until it is warmed up, or at a higher idling speed if desired.

Adjusting screw 44 may also be used to change idling speed without changing the welding speed, as will be clear. This adjustment gives a wide range of idling speed and is an important feature of my invention.

The foregoing constitutes a detailed description of a preferred embodiment of my invention, and it is believed that the construction, operation and advantages thereof will be clear therefrom without further explanation.

It is to be understood that other modifications in the relation of parts described, and also in details of construction may be resorted to without departing from the inventive concept disclosed, and right is herein reserved to all such modifications falling within the scope of the claims appended hereto.

What I claim is:

1. Speed control mechanism for a power plant including an internal combustion engine, a carbureter for said engine, a generator, and a normally open load circuit supplied by the generator, said mechanism comprising a lever pivotally mounted at one end for movement in opposite directions, connections between the other end of said lever and carbureter whereby movement of said lever in opposite directions controls said carbureter to accelerate and decelerate the engine respectively, means for moving the lever in one direction including an electromagnet in said circuit energized and deenergized by closing and opening of said circuit, respectively, tension means conditioned by movement of the lever in the last mentioned direction for reaction to move said lever in the opposite direction when the electromagnet is deenergized, and means to retard the action of said tension means.

2. Speed control mechanism for a power plant including an internal combustion engine, a carbureter for said engine, a generator, and a normally open load circuit supplied by the generator, said mechanism comprising a lever pivotally mounted at one end for movement in opposite directions, connections between the other end of said lever and carbureter whereby movement of said lever in opposite directions controls the said carbureter to accelerate and decelerate the engine respectively, means for moving the lever in one direction including an electromagnet in said circuit energized and deenergized by closing and opening of said circuit respectively, means for moving said lever in the opposite direction with a retarded action including a casing having a chamber therein, a diaphragm in said casing flexible in one direction to create a partial vacuum in the chamber on one side thereof and reactive from its flexed position, a piston rod operatively connecting said lever to said diaphragm whereby movement of said lever by the electromagnet flexes said diaphragm and reaction of the diaphragm moves the lever when the magnet is deenergized, and a valve in said casing for relieving the partial vacuum in said chamber.

3. Speed control mechanism for a power plant including an internal combustion engine, a carbureter for said engine, a generator, and a normally open load circuit supplied by the generator, said mechanism comprising a lever pivotally mounted at one end for movement in opposite directions, connections between the other end of said lever and carbureter whereby movement of said lever in opposite directions controls the said carbureter to accelerate and decelerate the engine respectively, means for moving the lever in one direction including an electromagnet in said circuit energized and deenergized by closing and opening of said circuit respectively, means for moving said lever in the opposite direction with a retarded action including a casing having a chamber therein, a diaphragm in said casing flexible in one direction to create a partial vacuum in the chamber on one side thereof and reactive from its flexed position, a piston rod operatively connecting said lever to said diaphragm whereby movement of said lever by the electromagnet flexes said diaphragm and reaction of the diaphragm moves the lever when the magnet is deenergized a valve in said casing for relieving the partial vacuum in said chamber, and settable means for variably controlling the degree of movement of said lever to correspondingly vary the control of said carbureter by the same.

ALVIN F. BRUNKOW.